US008780991B2

(12) United States Patent
Kwon et al.

(10) Patent No.: US 8,780,991 B2
(45) Date of Patent: Jul. 15, 2014

(54) MOTION ESTIMATION IN ENHANCEMENT LAYERS IN VIDEO ENCODING

(75) Inventors: Do-Kyoung Kwon, Allen, TX (US); Hyung Joon Kim, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 298 days.

(21) Appl. No.: 13/228,718

(22) Filed: Sep. 9, 2011

(65) Prior Publication Data

US 2012/0063516 A1    Mar. 15, 2012

Related U.S. Application Data

(60) Provisional application No. 61/382,534, filed on Sep. 14, 2010.

(51) Int. Cl.
*H04N 7/32* (2006.01)
(52) U.S. Cl.
USPC .................................................. 375/240.16
(58) Field of Classification Search
USPC .................................................. 375/240.16
See application file for complete search history.

(56) References Cited

U.S. PATENT DOCUMENTS

| | | | | |
|---|---|---|---|---|
| 5,337,154 | A | * | 8/1994 | Dorricott et al. ............... 348/448 |
| 5,731,850 | A | * | 3/1998 | Maturi et al. .................. 348/699 |
| 2004/0190620 | A1 | * | 9/2004 | Alfonso et al. ........... 375/240.16 |
| 2008/0225952 | A1 | * | 9/2008 | Wang et al. .............. 375/240.16 |
| 2009/0097548 | A1 | | 4/2009 | Karczewicz et al. |
| 2011/0069751 | A1 | | 3/2011 | Budagavi |
| 2011/0103481 | A1 | | 5/2011 | Nagori |
| 2012/0027079 | A1 | * | 2/2012 | Ye et al. .................... 375/240.02 |

OTHER PUBLICATIONS

H. Schwarz et al, "Constrained Inter-Layer Prediction for Single-Loop Decoding in Spatial Scalability", IEEE International Conference on Image Processing, Sep. 11-14, 2005, pp. 870-873.
Iraide Unanue et al, "A Tutorial on H.264/SVC Scalable Video Coding and its Tradeoff between Quality, Coding Efficiency and Performance", Recent Advances on Video Coding, InTech, Jul. 2011, pp. 3-26.
Minhua Zhou, "Sub-picture Based Raster Scanning Coding Order for HEVC UHD Video Coding", JCTVC-B062, Jul. 21-28, 2010, pp. 1-5, Joint Collaborative Team on Video Coding (JCT-VC) of ITU-T SG16 WP3 and ISO/IEC JTC1/SC29/WG11, Geneva, Switzerland.
H. Schwarz et al, "Overview of the Scalable Video Coding Extension of the H.264/AVC Standard", IEEE Transactions on Circuits and Systems for Video Technology, vol. 17, No. 9, Sep. 2007, pp. 1103-1120.
S. Shankar, "Unequal Error Protection for H.264/SVC Bitstream", San Diego State University, San Diego, CA, 2010, pp. 1-105.

(Continued)

*Primary Examiner* — Sath V Perungavoor
*Assistant Examiner* — Jeffery Williams
(74) *Attorney, Agent, or Firm* — Mirna Abyad; Frederick J. Telecky, Jr.

(57) ABSTRACT

A method for encoding a video sequence in a scalable video encoder is provided that includes selecting a first search window configuration for coding a current picture of the video sequence in an enhancement layer encoder of the scalable video encoder based on motion vectors generated by a reference layer encoder when encoding the current picture, and coding the current picture in the enhancement layer encoder using the first search window configuration.

17 Claims, 4 Drawing Sheets

(56) References Cited

OTHER PUBLICATIONS

C. A. Segall and G. J. Sullivan, "Spatial Scalability Within the H.264/AVC Scalable Video Coding Extension", IEEE Transactions on Circuits and Systems for Video Technology, vol. 17, No. 9, Sep. 2007, pp. 1121-1135.

"Advanced Video Coding for Generic Audiovisual Services", ITU-T Recommendation H.264, Series H: Audiovisual and Multimedia Systems, Infrastructure of Audiovisual Services—Coding of Moving Video, ITU-T Telecommunication Standardization Sector of ITU, Mar. 2010, pp. 1-676.

M. Wien et al, "Performance Analysis of SVC", IEEE Transactions on Circuits and Systems for Video Technology, vol. 17, No. 9, Sep. 2007, pp. 1194-1203.

* cited by examiner

MOTION ESTIMATION IN ENHANCEMENT LAYERS IN VIDEO ENCODING

CROSS-REFERENCE TO RELATED APPLICATIONS

This application claims benefit of U.S. Provisional Patent Application Ser. No. 61/382,534, filed Sep. 14, 2010, which is incorporated by reference herein in its entirety.

BACKGROUND OF THE INVENTION

1. Field of the Invention

Embodiments of the present invention generally relate to a method and apparatus for motion estimation in enhancement layers in video encoding.

2. Description of the Related Art

The demand for digital video products continues to increase. Some examples of applications for digital video include video communication (e.g., video conferencing and multimedia messaging), security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video transmission systems using the internet and mobile networks have a wide range of receiving devices, i.e., video endpoints, ranging, for example, from cellular telephones with small screens to tablet computers to personal computers with high definition displays to video conferencing systems with large screens. That is, the devices receiving a video transmission may have different resolution, frame rate, and bandwidth capabilities. Scalable video coding (SVC) is one technique that may be used to allow a video to be received by a range of receiving devices according to the capabilities of each device. In general, SVC refers to encoding a video as a single scalable video bit stream with one or more subset bit streams that are adapted to varying video endpoint capabilities, network conditions, and/or user preferences.

A video bit stream is scalable when parts of the stream can be removed such that the resulting subset bit stream is a valid bit stream for some target decoder, and the subset bit stream represents the original video content with a reconstruction quality that is less than that of the complete original bit stream but is high in view of the lower quantity of data in the subset bit stream. Typically, three scalability modes are considered: temporal, spatial, and quality. A spatially scaled subset bit stream represents the original video content at a reduced picture size. A temporally scaled subset bit stream represents the original video content at a reduced frame rate. A quality scaled subset bit stream represents the original video content at the same spatial and temporal resolution as the complete bit stream but at a lower quality, i.e., signal-to-noise ratio (SNR).

H.264/SVC is an example of a video coding standard that provides scalable video coding. More specifically, H.264/SVC is a scalable video coding (SVC) extension of H.264/AVC that supports temporal, spatial and quality scalability functions. A summary of H.264/SVC is presented in H. Schwarz, et al., "Overview of The Scalable Video Coding Extension of the H.264/SVC Standard," IEEE Trans. Circuits and Systems, vol. 17, No. 9, September 2007, "Schwartz" herein, which is incorporated by reference herein in its entirety. The full description of the SVC extension can be found in Annex G of "Advanced Video Coding for Generic Audio Visual Services," ITU-T Rec. H.264|ISO/IEC 14496-10, March 2010, "H.264 standard" herein, which is incorporated by reference herein in its entirety. The temporal scalability of H.264/SVC allows decoding of a bit stream at different frame rates by partitioning a set of pictures into a temporal base layer bit stream and temporal enhancement layer bit streams. The spatial scalability and quality scalability of H.264/SVC allow encoding of video at different resolutions and qualities as a base layer bit stream and one or more enhancement layer bit streams.

SUMMARY

Embodiments of the invention relate to a method and digital system that provide for encoding of a video sequence in a scalable video encoder. The encoding includes selecting a first search window configuration for coding a current picture of the video sequence in an enhancement layer encoder of the scalable video encoder based on motion vectors generated by a reference layer encoder when encoding the current picture, and coding the current picture in the enhancement layer encoder using the first search window configuration.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
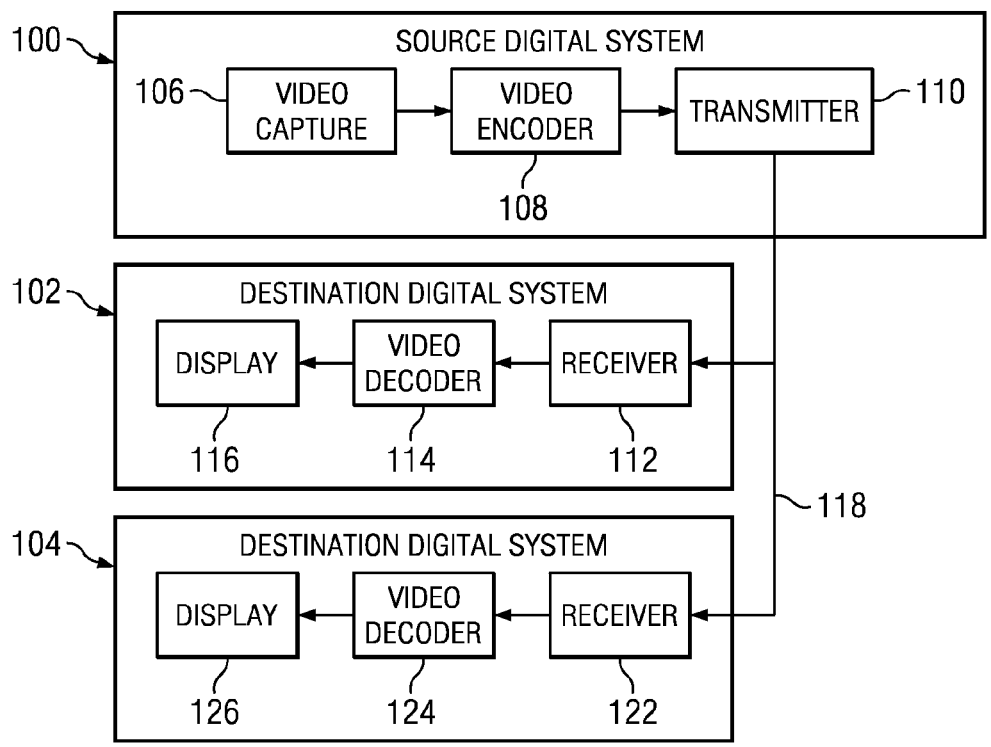
FIG. 1 is a block diagram of a video transmission system for scalable video bit streams.

Specific embodiments of the invention will now be described in detail with reference to the accompanying figures. Like elements in the various figures are denoted by like reference numerals for consistency.

As used herein, the term "picture" refers to a frame or a field of a frame. A frame is a complete image captured during a known time interval. When a video sequence is in progressive format, the term picture refers to a complete frame. When a video sequence is in interlaced format, each frame is composed of a field of odd-numbered scanning lines followed by a field of even-numbered lines. Each of these fields is a picture. Further, the term macroblock as used herein refers to a block of image data in a picture used for block-based video encoding. One of ordinary skill in the art will understand that the size and dimensions of a macroblock are defined by the particular video coding standard in use and thus may vary, and that different terminology may be used to refer to such a block.

Embodiments of the invention provide for the adaptive selection of a search window configuration, e.g., sliding search window, growing search window, or hybrid search window, for motion estimation in the enhancement layers of a scalable video encoder. More specifically, prior to encoding a picture in an enhancement layer, a search window configuration is selected for the picture based on the motion vectors determined for the macroblocks in the picture when the picture was encoded in the reference layer for that enhancement layer. The reference layer may be the base layer of the scalable video encoder or a lower enhancement layer in the layer hierarchy. The global motion vector of the picture as encoded by the reference layer may also be used in the search window configuration selection. In some embodiments, initial search points for motion estimation of a macroblock in an enhancement layer may include one or both of the scaled global motion vector of the picture as encoded by the reference layer and the scaled motion vector of the collocated macroblock in the reference layer picture.

FIG. 1 shows a block diagram of a video transmission system for scalable video bit streams. The system includes a source digital system 100 that transmits encoded video sequences to multiple destination digital systems 102, 104 via a communication channel 118. While FIG. 1 shows two destination digital systems, the video transmission system may include any number of destination digital systems. The source digital system 100 includes a video capture component 106, a video encoder component 108, and a transmitter component 110. The video capture component 106 is configured to provide a video sequence to be encoded by the video encoder component 108. The video capture component 106 may be, for example, a video camera, a video archive, or a video feed from a video content provider. In some embodiments, the video capture component 104 may generate computer graphics as the video sequence, or a combination of live video, archived video, and/or computer-generated video.

The video encoder component 108 receives a video sequence from the video capture component 106 and encodes it in accordance with the H.264/SVC coding standard as a scalable video bit stream for transmission by the transmitter component 110. In general, the video encoder component 108 receives the video sequence from the video capture component 106 as a sequence of pictures, divides the pictures into macroblocks, and encodes the video data in the macroblocks as a base layer bit stream and one or more enhancement layer bit streams providing spatial, temporal, and/or quality scalability over the base layer bit stream. The base layer bit stream and the one or more enhancement layer bit streams are output as the single scalable video bit stream. For spatial scalability, the base layer bit stream may be encoded at a base spatial resolution and the one or more enhancement layer bit streams may be encoded at higher levels of spatial resolution. The video encoder component 108 applies a method for motion estimation in the enhancement layers during the encoding process as described herein when encoding for spatial scalability. An embodiment of the video encoder component 108 is described in more detail below in reference to FIG. 2.

The transmitter component 110 transmits the scalable video bit stream to the destination digital systems 102, 104 via the communication channel 118. The communication channel 118 may be any communication medium, or combination of communication media suitable for transmission of the encoded video sequence, such as, for example, wired or wireless communication media, a local area network, or a wide area network.

The destination digital systems 102, 104 may be any digital system configured to receive and decode scalable video bit streams. For example, a destination digital system may be a cellular telephone, a video gaming device, a desktop computer, a laptop computer, a tablet computing device, a digital television, etc. The destination digital systems 102, 104 each include a receiver component 112, 122, a video decoder component 114, 124, and a display component 116, 126. The receiver components 112, 122 receive the scalable video bit stream from the source digital system 100 via the communication channel 118 and provide the encoded video data to the respective video decoder components 114, 124 for decoding.

In general, the video decoder components 114, 122 decode the scalable video bit stream in accordance with the H.264/SVC video coding standard to reconstruct the video sequence. However, the video decoder components 114, 122 may have different decoding capabilities depending on, for example, the resolution of the respective display component 116, 126 and the computational and memory resources of the respective destination digital system 102, 104. For example, if destination digital system 102 has limited memory and computational resources, the video decoder component 114 may be configured to decode only the base layer bit stream. If destination digital system 104 has a display with a higher resolution than that of the base layer bit stream and sufficient resources, the video decoder component 124 may be configured to decode the base layer bit stream and the enhancement layer bit stream(s) appropriate for the higher resolution.

The respective reconstructed video sequences are displayed on the respective display components 116, 126. The display components 116, 126 may be any suitable display devices such as, for example, a plasma display, a liquid crystal display (LCD), a light emitting diode (LED) display, etc.

In some embodiments, the source digital system 100 may also include a receiver component and a video decoder component and/or the destination digital systems 102, 104 may include a transmitter component and a video encoder component for transmission of video sequences in both directions for video streaming, video broadcasting, and video telephony. The video encoder component 108 and the video decoder components 114, 124 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
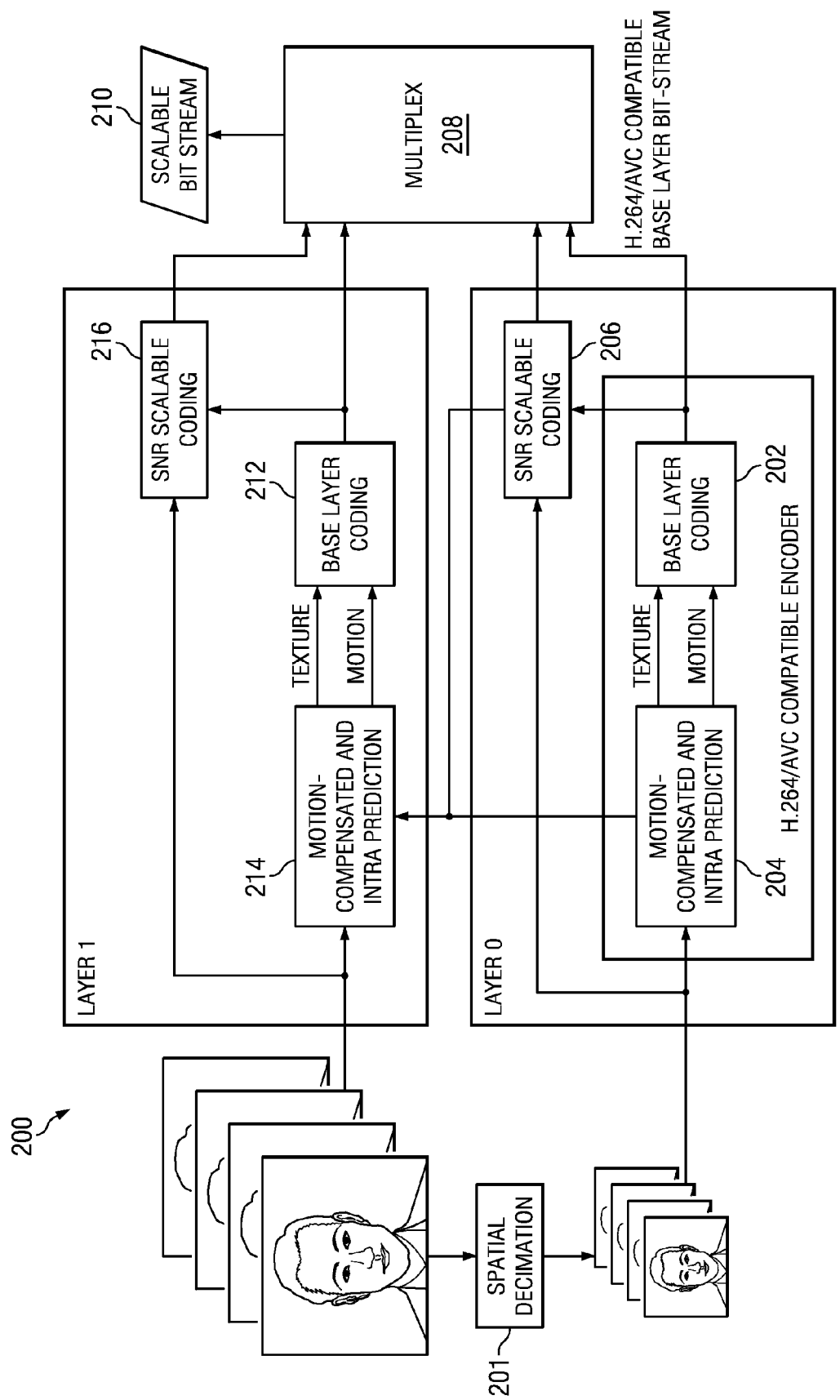
FIG. 2 is a block diagram of a scalable video encoder.

FIG. 2 shows a high level block diagram of a two spatial layer configuration of an H.264/SVC scalable video encoder 200. The general functionality of an H.264/SVC scalable video encoder is well known and thus is not described in detail herein. More detailed descriptions may be found, for example, in Schwartz and the H.264 standard. A description of the spatial scalability of an H.264/SVC scalable video encoder is provided in C. Segall and G. Sullivan, "Spatial Scalability Within the H.264 AVC Scalable Video Coding Extension," IEEE Trans. Circuits and Systems, Vol. 17, No. 9, September 2007.

For illustration, FIG. 2 shows an encoder structure with two spatial layers, a base layer encoder, Layer 0, and one enhancement layer encoder, Layer 1. One of ordinary skill in the art will understand that the scalable video encoder 200 may include more enhancement layers. A coarse-to-fine hierarchy of images is encoded. That is, the input high-resolution video sequence is converted to a lower resolution by filtering and decimation 201. Each layer of the H.264/SVC scalable video encoder 200 is basically an H.264/AVC video encoder extended with inter layer prediction and SNR scalability 206, 216. In general, the temporal scalability of H.264/SVC is the same as that of H.264/AVC. The base layer encoder encodes the lowest resolution of the input video sequence as an H.264/AVC compliant bit stream and the enhancement layer encoder encodes a higher resolution of the input video sequence according to H.264/SVC. The output bit streams of the encoders are multiplexed 208 to form the scalable video bit stream 210.

In each encoder layer, motion-compensated prediction and intra prediction 204, 214 as well as base layer coding 202, 212 functions such as quantization, transformation, entropy coding, and deblocking are performed. Inter-layer prediction is also provided to improve the compression efficiency between layers. Inter-layer prediction exploits the redundancy between the layers by providing inter layer macroblock mode prediction, residual prediction, and motion prediction between an enhancement layer and its reference layer.

For mode prediction, the enhancement layer encoder estimates the prediction mode of a macroblock in an enhancement layer picture from the prediction mode for the collocated macroblock in the reference layer picture. If the collocated macroblock was intra coded, the MCIP module 214 codes the macroblock in Intra_BL mode, which uses the reconstructed samples of the collocated macroblock as predictors. If the collocated macroblock was inter coded, the MCIP module 214 codes the macroblock in inter mode and uses the motion vectors of the collocated macroblock, with appropriate scaling, for motion prediction of the macroblock.

Figure 3:
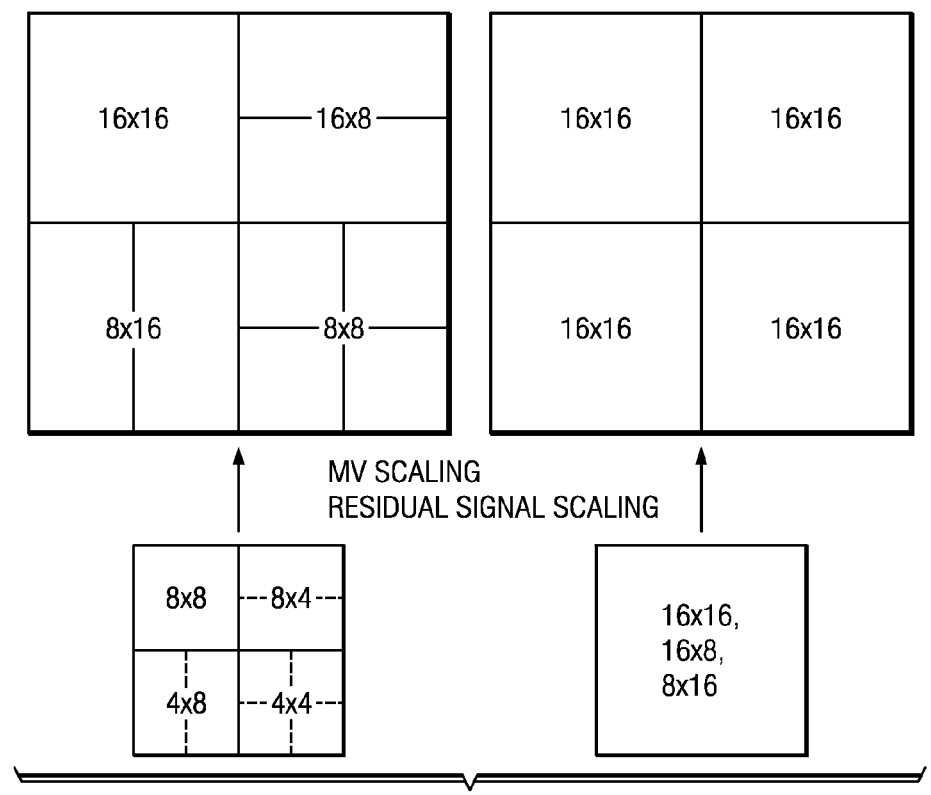
FIG. 3 is an example of macroblock scaling between an enhancement layer and a reference layer.

A collocated macroblock is a macroblock in the same scaled location in a picture in the reference layer video sequence as the macroblock in the enhancement layer video sequence or vice versa. H.264/SVC supports spatial scalability with arbitrary resolution ratios up to 2×. When the estimated prediction mode is the inter mode, the partitioning of a macroblock by the MCIP module 214 for motion prediction is determined by scaling and realigning the partitioning of the reference layer macroblock. For example, for dyadic spatial scalability, each enhancement layer macroblock corresponds to an 8×8 reference layer macroblock partition in the reference layer. Thus, the enhancement layer macroblock partitioning for motion prediction may be obtained by scaling the partitioning of the collocated 8×8 reference block by a factor of two horizontally and vertically. FIG. 3 illustrates the scaling for dyadic spatial scalability. The scaling computations to determine corresponding spatial positions between arbitrary resolutions are described in the H.264 standard. Motion vectors are scaled by the same ratio.

For residual prediction, when both an enhancement layer macroblock and the collocated reference layer macroblock are inter coded, the enhancement layer encoder estimates the residual signal of the enhancement layer macroblock from the residual samples of the collocated reference layer macroblock. That is, the residual signal of the collocated reference layer macroblock is used as a predictor for the residual signal of the enhancement layer macroblock. More specifically, rather than entropy coding the transformed and quantized residual of a macroblock, the enhancement layer encoder entropy codes the difference between the transformed and quantized residual of the enhancement layer macroblock and the transformed and quantized residual of the collocated reference layer macroblock.

For motion prediction, when both an enhancement layer macroblock and the collocated reference layer macroblock are inter coded, the enhancement layer encoder estimates the motion vectors of a macroblock from the motion vectors of the collocated reference layer macroblock. That is, motion vectors of the collocated reference layer macroblock are used as predictors for the motion vectors of the enhancement layer macroblock. More specifically, rather than entropy coding the motion vectors of a macroblock, the enhancement layer encoder entropy codes the difference between the motion vectors of the enhancement layer macroblock and the motion vectors of the collocated reference layer macroblock.

Figure 4A:
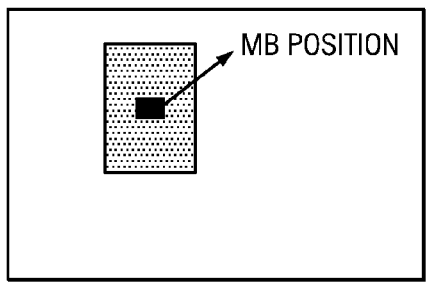
FIGS. 4A-4C are examples of search window configurations for motion estimation.
Figure 4B:
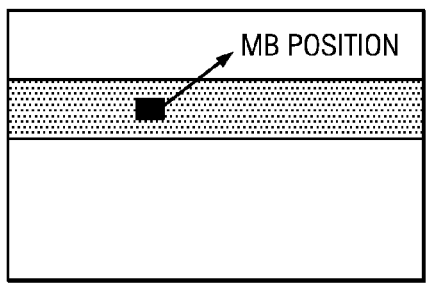
Figure 4C:
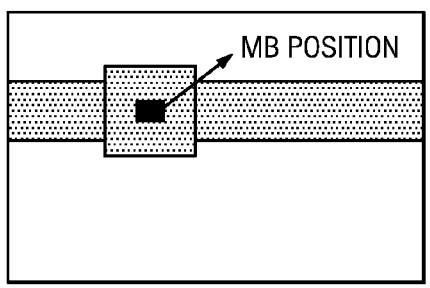
Figure 6:
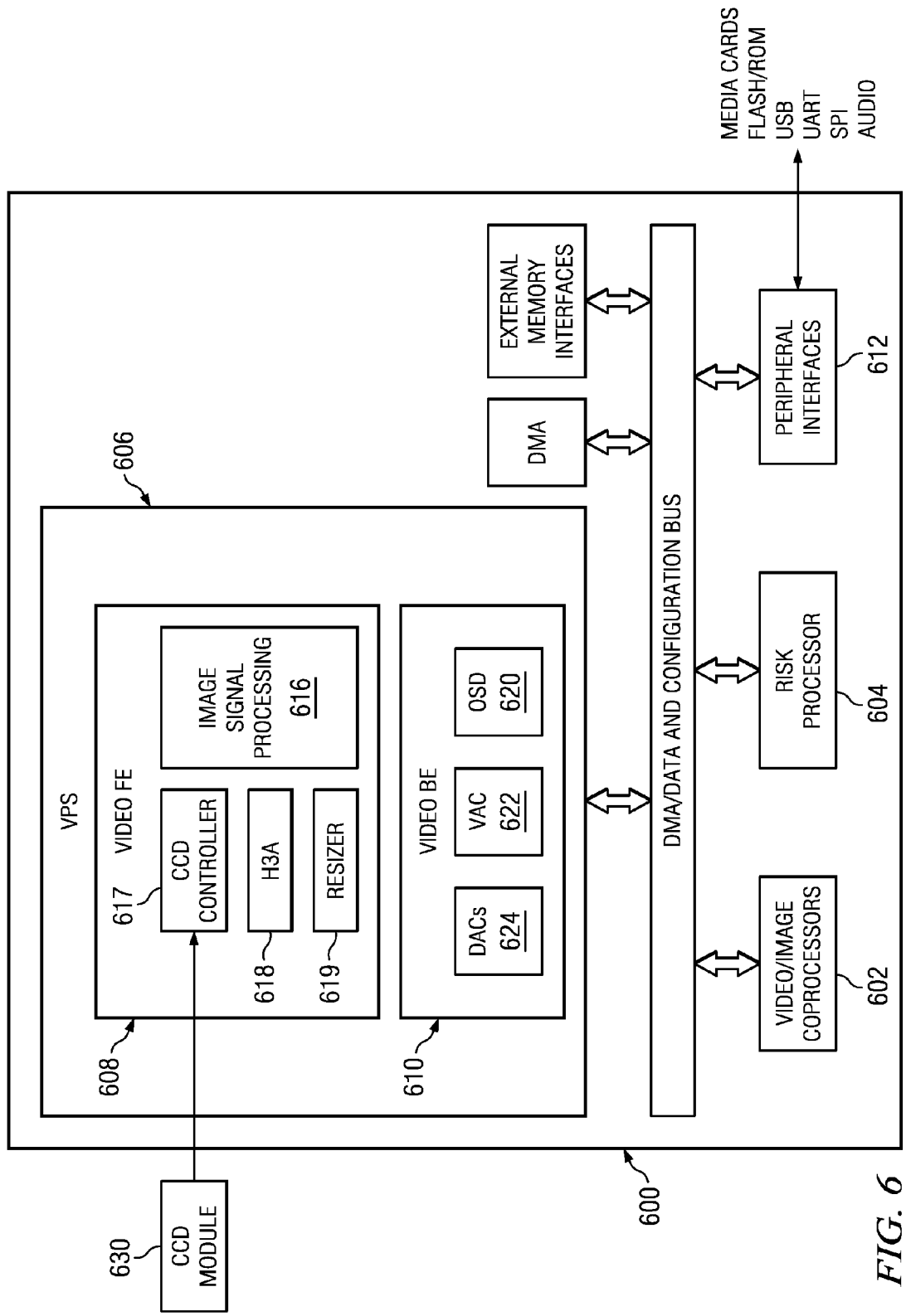
FIG. 6 is a block diagram of an illustrative digital system.

When a video encoder is implemented on an embedded system with limited resources such as the system-on-a-chip (SOC) of FIG. 6, motion estimation can consume a significant amount of computational resources and memory access bandwidth. To ameliorate the computational and memory bandwidth requirements, reference data used for motion estimation may be cached in on-chip memory using a caching strategy based on a search window configuration and the size of the on-chip memory, and one or more motion vectors may be used as initial search points, i.e., motion vector predictors, in the search window. For example, neighboring motion vectors in the same picture or corresponding motion vectors in a reference picture may be used as initial search points. FIGS. 4A-4C show examples of three search window configurations that may be used for motion estimation, respectively a sliding search window, a growing search window, and a hybrid search window. In these figures, the shaded area represents the size of the on-chip memory and shows the reference data cached in the on-chip cache relative to a reference picture.

Caching with a sliding search window (FIG. 4A) maintains a block of reference picture data in the on-chip memory that horizontally and vertically "surrounds" the macroblock for which motion estimation is being performed. The horizontal and vertical limits of the search window are determined by the size of the on-chip memory. The sliding search window may be preferred when the size of the on-chip memory is small but consumes more memory bandwidth than the other window configurations. Caching with a growing search window (FIG. 4B) maintains some number of rows of reference picture macroblocks in the on-chip memory that are above and below the row of macroblocks for which motion estimation is being performed. The number of rows maintained in the cache is dependent on the size of the on-chip memory. The growing search window imposes no horizontal limit on motion vectors but does limit the motion vectors vertically by the number of rows available in the cache. The growing search window requires a larger on-chip memory than the sliding search window but consumes less memory bandwidth.

Caching with a hybrid search window (FIG. 4C) combines the sliding search window and the growing search window. That is, hybrid search window caching maintains in the on-chip memory both a block of reference picture data that horizontally and vertically "surrounds" the macroblock for which motion estimation is being performed and some number of rows of reference picture macroblocks that are above and below the row of macroblocks for which motion estimation is being performed. The number of rows maintained in the on-chip cache for the growing window and the horizontal and vertical limits of the sliding window are dependent on the size of the on-chip memory. Similar to the growing search window, the hybrid search window imposes no horizontal limit on motion vectors but does permit a larger vertical search range in the sliding window. The vertical range of the sliding window will typically be larger than the vertical range of the pure growing search window while the growing window of the hybrid search window will be vertically smaller then the pure growing search window.

For an H.264/SVC scalable video encoder and a given on-chip memory size, the horizontal and vertical search range for motion estimation for a reference layer encoder will be higher than that of an enhancement layer encoder no matter which search window configuration is used due to the lower resolution of the video encoded by the reference layer encoder. However, one requirement for using mode prediction is that the scaled motion vectors for the collocated macroblocks in the reference layer have to be in the search range of the enhancement layer. For optimal coding performance, it is also important that the search window configuration used for motion estimation in the enhancement layer encoder covers as many of the scaled motion vectors generated when encoding the picture in the reference layer encoder as possible.

Figure 5:
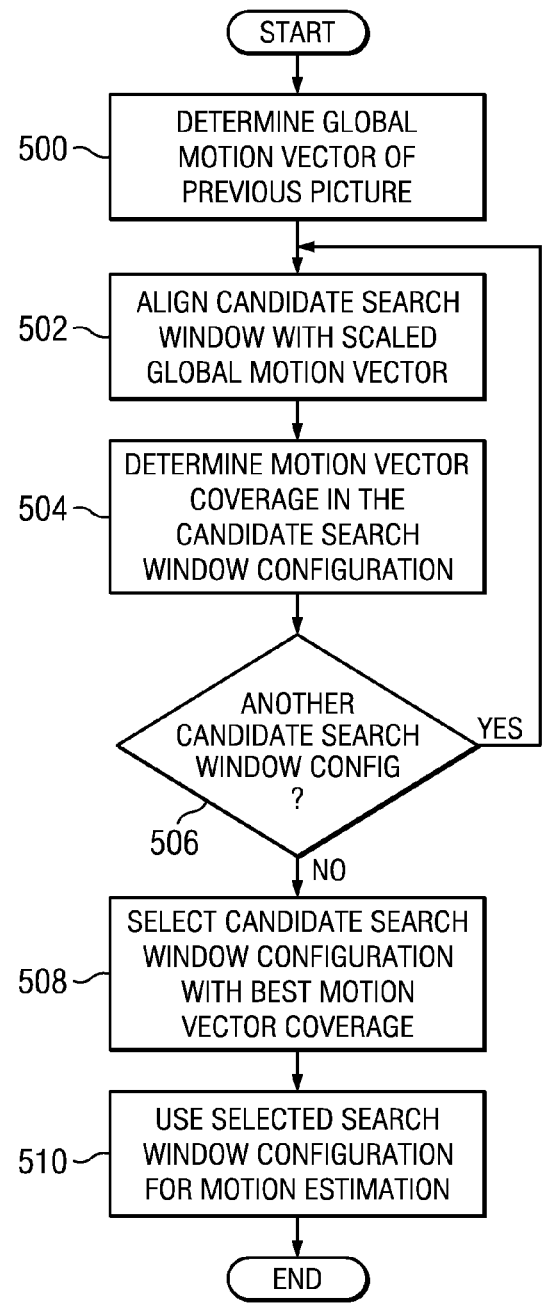
FIG. 5 is a flow diagram of a method for motion estimation in a scalable video encoder.

FIG. 5 is a flow graph of a method for motion estimation in enhancement layers of a scalable video encoder that supports multiple search window configurations, e.g., sliding search window, growing search window, and hybrid search window. The method provides for adaptive selection of a search window configuration to be used for motion estimation when encoding a picture in an enhancement layer encoder of the scalable video encoder. The search window configuration selection is based on motion vectors generated when coding the picture in the reference layer encoder. The method of FIG. 5 may be performed for each picture in a video sequence prior to encoding that picture in an enhancement layer encoder.

Initially, the global motion vector, i.e., average motion vector, from encoding the current picture in the video sequence in the reference layer encoder is determined 500. The motion vector coverage of each of the search window configurations supported by the scalable video encoder is then determined 502-506, and the search window configuration with the best motion vector coverage is selected 508. The selected search window configuration is then used for motion estimation as the picture is encoded by the enhancement layer encoder 510. In some embodiments, the scaled global motion vector is used as an initial search point when motion estimation is performed. Further, in some embodiments, for each macroblock in the current picture, the scaled motion vector of the collocated macroblock in the reference layer picture is used as an initial search point when motion estimation is performed for the macroblock.

Motion vector coverage may be determined, for example, based on the number of motion vectors from the encoded reference layer picture, i.e., reference motion vectors, that fit within the horizontal and vertical search range of a search window or based on the cumulative motion vector costs of the reference motion vectors that fit within a search window. To determine whether or not a reference motion vector fits within a search window, the motion vector is scaled as per the enhancement layer resolution. The horizontal component of the scaled motion vector is then compared to the horizontal search range of the search window and the vertical component is compared to the vertical search range. Note that for a growing search window and a hybrid search window, there is no need to consider the horizontal component as entire rows of macroblocks are maintained in such search windows. If a global motion vector is used for motion estimation, the horizontal and vertical ranges of the search window are adjusted as needed to account for the global motion. For example, if the scaled global motion vector is (15, 15) and the vertical search range of a search window is +64, −64, the effective vertical search range will be +79, −49.

The number of reference motions vectors MVCount that fit within a candidate search window may be determined as follows:

$$MVCount = \sum_{i=1}^{N} I_i,$$

where $I_i = \begin{cases} 1, & \text{if } i\text{th scaled reference } MV \text{ fits in the search window} \\ 0, & \text{otherwise} \end{cases}$ where N is the number of reference motion vectors. The reference motion vectors considered may be, for example, all motion vectors generated when the picture was encoded by the reference layer encoder or all motion vectors for the macroblocks that were actually inter coded. The candidate search window with the largest MVCount is considered to have the best motion vector coverage.

The cumulative motion vector cost MVCost of reference layer motion vectors that fit within a candidate search window may be determined as follows:

$$MVCost = \sum_{i=1}^{N} c_i, \text{ where } C_i = \begin{cases} mvcost_i & \text{if } mvcost_i < TH \\ 0, & \text{otherwise} \end{cases}$$

where N is the number of reference motion vectors that fit within the candidate search window, $mvcost_i$ is the motion vector cost of the i-th motion vector, and TH is a threshold cost. The value of TH may be empirically predetermined and/or may be user specified. The reference motion vectors considered may be, for example, all motion vectors generated when the picture was encoded by the reference layer encoder or all motion vectors for the macroblocks that were actually inter coded. The candidate search window with the largest MVCost is considered to have the best motion vector coverage.

An embodiment of the method was evaluated in an H.264/SVC video encoder for 720 p-1080 p 1.5× scalable encoding with a hierarchical B coding sequence. The method was applied in the 1080 p enhancement layer. The growing search window configuration was used as the default in the base layer and the enhancement layer. The growing search window configuration and the hybrid search window configuration were used for the adaptive search window selection in the enhancement layer. The method improved the PSNR of the enhancement layer encoder by 0.03 dB on average over twenty test video sequences. However, as shown in Table 1, the method improved the PSNR of the enhancement layer encoder by 0.11 dB for five high-motion sequences. The method yield better PSNR improvement for video with higher resolutions than 1080 p.

TABLE 1

|   |   | PSNR Change |
|---|---|---|
| 1 | Pedestrian | 0.06 |
| 2 | Viperkillercuts | 0.12 |
| 3 | redKayak | 0.20 |
| 4 | speedBag | 0.14 |
| 5 | ToduchdownPass | 0.06 |
|   | Average | 0.11 |

Embodiments of the methods and encoders described herein may be implemented for virtually any type of digital system (e.g., a desk top computer, a laptop computer, a tablet computing device, a handheld device such as a mobile (i.e., cellular) phone, a digital camera, etc.). FIG. 6 shows a digital system 600 suitable for use as an embedded system, e.g., in a digital camera. The digital system 600 may be configured to perform adaptive search window configuration selection as described herein. The digital system 600 includes, among other components, one or more video/image coprocessors 602, a RISC processor 604, and a video processing system (VPS) 606. The digital system 600 also includes peripheral interfaces 612 for various peripherals that may include a multimedia card, an audio serial port, a Universal Serial Bus (USB) controller, a serial port interface, etc.

The RISC processor 604 may be any suitably configured RISC processor. The video/image coprocessors 602 may be, for example, a digital signal processor (DSP) or other processor designed to accelerate image and/or video processing. One or more of the video/image coprocessors 602 may be configured to perform computational operations required for video encoding of captured images. Further, one or more of the video/image coprocessors 602 may include hardware and software functionality to cache video data according to multiple search window configurations. The video encoding standards supported may include, for example, one or more of the JPEG standards, the MPEG standards, H.264/AVC, and H.264/SVC. The computational operations of the adaptive search window configuration selection may be performed by the RISC processor 604 and/or the video/image coprocessors 602. For example, one or more of the processors may execute software instructions to perform the method of FIG. 5.

The VPS 606 includes a configurable video processing front-end (Video FE) 608 input interface used for video capture from a CCD imaging sensor module 630 and a configurable video processing back-end (Video BE) 610 output interface used for display devices such as digital LCD panels.

The Video FE 608 includes functionality to perform image enhancement techniques on raw image data from the CCD imaging sensor module 630. The image enhancement techniques may include, for example, black clamping, fault pixel correction, color filter array (CFA) interpolation, gamma correction, white balancing, color space conversion, edge enhancement, detection of the quality of the lens focus for auto focusing, and detection of average scene brightness for auto exposure adjustment.

The Video FE 608 includes an image signal processing module 616, an H3A statistic generator 618, a resizer 619, and a CCD controller 616. The image signal processing module 616 includes functionality to perform the image enhancement techniques. The H3A module 618 includes functionality to support control loops for auto focus, auto white balance, and auto exposure by collecting metrics on the raw image data.

The Video BE 610 includes an on-screen display engine (OSD) 620, a video analog encoder (VAC) 622, and one or more digital to analog converters (DACs) 624. The OSD engine 620 includes functionality to manage display data in various formats for several different types of hardware display windows and it also handles gathering and blending of video data and display/bitmap data into a single display window before providing the data to the VAC 622 in YCbCr format. The VAC 622 includes functionality to take the display frame from the OSD engine 620 and format it into the desired output format and output signals required to interface to display devices. The VAC 622 may interface to composite NTSC/PAL video devices, S-Video devices, digital LCD devices, high-definition video encoders, DVI/HDMI devices, etc.

Other Embodiments

While the invention has been described with respect to a limited number of embodiments, those skilled in the art, having benefit of this disclosure, will appreciate that other embodiments can be devised which do not depart from the scope of the invention as disclosed herein.

While various embodiments have been described herein in reference to the H.264/SVC video coding standard, embodiments for other coding standards that provide a layered approach to coding a scalable video bit stream will be understood by one of ordinary skill in the art. Accordingly, embodiments of the invention should not be considered limited to the H.264/SVC video coding standard.

Embodiments of the video encoder and method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown and described may be combined, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding a video sequence in a scalable video encoder, the method comprising:
   selecting a first search window configuration for coding a current picture of the video sequence in an enhancement layer encoder of the scalable video encoder based on motion vectors generated by a reference layer encoder when encoding the current picture, wherein selecting a first search window configuration comprises determining motion vector coverage for the first search window configuration based on the motion vectors, comprising:
      scaling a motion vector; and
      adding a cost of the motion vector to a cumulative motion vector cost if the scaled motion vector fits in the first search window configuration and the cost is less than a cost threshold,
   wherein the cumulative motion vector cost indicates the motion vector coverage of the first search window configuration; and
   coding the current picture in the enhancement layer encoder using the first search window configuration.

2. The method of claim 1, wherein the reference layer encoder is a base layer encoder in the scalable video encoder.

3. The method of claim 1, wherein the first search window configuration is selected from a plurality of search window configurations comprising a growing search window configuration and a hybrid search window configuration.

4. The method of claim 1, wherein the current picture is encoded in the reference layer encoder at a lower resolution than in the enhancement layer encoder.

5. The method of claim 1, further comprising
   determining a global motion vector for the current picture when the current picture is encoded by the reference layer encoder; and
   wherein coding the current picture in the enhancement layer encoder further comprises coding a macroblock in the current picture, wherein at least one of the global motion vector and a motion vector of a collocated macroblock are used as initial search points for motion estimation.

6. The method of claim 1, further comprising selecting a second search window configuration for coding another picture of the video sequence in the enhancement layer encoder based on motion vectors generated by the reference layer encoder when encoding the another picture, wherein the second search window configuration is different from the first search window configuration.

7. The method of claim 1, wherein selecting a first search window configuration further comprises:
    selecting the first search window configuration from a plurality of search window configurations when the motion vector coverage of the first search window configuration is better than motion vector coverage of other search window configurations in the plurality of search window configurations.

8. The method of claim 7, wherein determining motion vector coverage comprises:
    scaling a motion vector; and
    incrementing a motion vector count if the scaled motion vector fits in the first search window configuration,
    wherein the motion vector count indicates the motion vector coverage of the first search window configuration.

9. The method of claim 7, wherein the motion vectors are one selected from a group consisting of all motion vectors generated by the reference layer encoder when encoding the current picture and motion vectors of macroblocks in the current picture that were inter coded by the reference layer encoder.

10. A digital system comprising a video encoder for encoding a video sequence, the video encoder comprising:
    means for selecting a first search window configuration for coding a current picture of the video sequence in an enhancement layer encoder of the scalable video encoder based on motion vectors generated by a reference layer encoder when encoding the current picture, wherein the means for selecting a first search window configuration comprises means for determining motion vector coverage for the first search window configuration based on the motion vectors, comprising:
    means for scaling a motion vector; and
    means for adding a cost of the motion vector to a cumulative motion vector cost if the scaled motion vector fits in the first search window configuration and the cost is less than a cost threshold,
    wherein the cumulative motion vector cost indicates the motion vector coverage of the first search window configuration; and
    means for coding the current picture in the enhancement layer encoder using the first search window configuration.

11. The digital system of claim 10, wherein the reference layer encoder is a base layer encoder in the scalable video encoder.

12. The digital system of claim 10, wherein the first search window configuration is selected from a plurality of search window configurations comprising a growing search window configuration and a hybrid search window configuration.

13. The digital system of claim 10, wherein the current picture is encoded in the reference layer encoder at a lower resolution than in the enhancement layer encoder.

14. The digital system of claim 10, further comprising means for selecting a second search window configuration for coding another picture of the video sequence in the enhancement layer encoder based on motion vectors generated by the reference layer encoder when encoding the another picture, wherein the second search window configuration is different from the first search window configuration.

15. The digital system of claim 10, wherein the means for selecting a first search window configuration further comprises:
    means for selecting the first search window configuration from a plurality of search window configurations when the motion vector coverage of the first search window configuration is better than motion vector coverage of other search window configurations in the plurality of search window configurations.

16. The digital system of claim 15, wherein the means for determining motion vector coverage comprises:
    means for scaling a motion vector; and
    means for incrementing a motion vector count if the scaled motion vector fits in the first search window configuration,
    wherein the motion vector count indicates the motion vector coverage of the first search window configuration.

17. The digital system of claim 15, wherein the motion vectors are one selected from a group consisting of all motion vectors generated by the reference layer encoder when encoding the current picture and motion vectors of macroblocks in the current picture that were inter coded by the reference layer encoder.

* * * * *